(12) United States Patent
Evans (10) Patent No.: US 6,278,722 B1
(45) Date of Patent: Aug. 21, 2001

(54) ARCHITECTURE FOR A DIGITAL PORTABLE TELEPHONE

(75) Inventor: James Gifford Evans, Forked River, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/030,554

(22) Filed: Feb. 25, 1998

(51) Int. Cl.$^7$ .................................................. H04B 15/00
(52) U.S. Cl. .......................... 375/133; 455/426; 455/462; 455/464; 455/465
(58) Field of Search .................................. 375/133, 347; 455/426, 462, 464, 465, 101

(56) References Cited

U.S. PATENT DOCUMENTS

| | | | |
|---|---|---|---|
| 3,986,122 | * 10/1976 | McManus | 325/42 |
| 4,630,257 | * 12/1986 | White | 370/29 |
| 5,115,463 | * 5/1992 | Moldavsky et al. | 379/58 |
| 5,201,071 | * 4/1993 | Webb | 455/101 |
| 5,212,684 | * 5/1993 | MacNemee et al. | 370/24 |
| 5,297,203 | * 3/1994 | Rose et al. | 380/9 |
| 5,307,370 | * 4/1994 | Eness | 375/1 |
| 5,353,341 | * 10/1994 | Gillis et al. | 379/61 |
| 5,617,467 | * 4/1997 | Bacher et al. | 379/58 |
| 5,727,023 | * 3/1998 | Dent | 375/244 |
| 5,794,152 | * 8/1998 | Hikuma et al. | 455/502 |
| 5,809,417 | * 9/1998 | Nealon et al. | 455/426 |
| 5,812,951 | * 9/1998 | Ganesan et al. | 455/445 |
| 5,848,095 | * 12/1998 | Deutsch | 375/202 |
| 5,911,119 | * 6/1999 | Bartholomow et al. | 455/402 |
| 5,949,796 | * 9/1999 | Kumar | 370/529 |
| 5,982,807 | * 11/1999 | Snell | 375/200 |

* cited by examiner

Primary Examiner—Stephen Chin
Assistant Examiner—Mohammad Ghayour
(74) Attorney, Agent, or Firm—Priest & Goldstein, PLLC (57) ABSTRACT

A digital portable telephone is configured without the complex circuitry normally required for its base unit and handset unit to switch between transmit and receive states while frequency hopping in a frequency hopping system. The architecture for this digital portable telephone provides improved performance over that of other digital portable telephones by combining the frequency hopping spread spectrum technique with other spread spectrum techniques in communications between the handset unit and the base unit. Specifically, delta modulation and a redundant transmission of the signal are the other forms of signal spreading that are employed. Such signal spreading advantageously achieves additional processing gain. Another attractive attribute of this architecture is a high level of immunity to interference from other portable telephones also operating in the same frequency hopping band. Finally, the circuit architecture is simplified and the cost for a portable telephone employing simplified circuits is less than a portable telephone employing circuitry required to switch between transmit and receive states while frequency hopping in a frequency hopping system.

17 Claims, 10 Drawing Sheets

ARCHITECTURE FOR A DIGITAL PORTABLE TELEPHONE

BACKGROUND OF THE INVENTION

1. Technical Field

This invention relates to portable telephones and more particularly to a portable telephone arranged for communicating in a frequency hopping system

2. Description of the Prior Art

The Federal Communications Commission (FCC) recently promulgated rulings in the utilization of spread spectrum systems, including a frequency hopping system. These rulings now allow for increased spectral utilization by portable telephones. Frequency hopping systems spread their energy by changing, or hopping the center frequency of the transmission many times a second in accordance with a pseudo-randomly generated list of communication channels. The result is a significantly higher signal to noise ratio than may be achieved by conventional techniques such as amplitude modulation that uses no bandwidth spreading.

Digital portable telephones are now being designed for use in spread spectrum systems, including frequency hopping systems. Examples of such digital portable telephones are described in U.S. Pat. No. 5,323,447 which issued to M. E. Gillis et al. on Jun. 21, 1994, U.S. Pat. No. 5,353,341 which issued to M. E. Gillis et al. on Oct. 4, 1994 and U.S. Pat. No. 5,463,659 which issued to W. J. Nealon et al. on Oct. 31, 1995. Each of these digital portable telephones utilizes time division duplexing for communicating between a base unit and its associated handset unit. In the operation of such a portable telephone, the base unit and the handset unit communicate with each other by alternately transmitting and receiving a signal on the same channel. Thus, while the base unit is transmitting on a channel, the handset unit is configured for receiving the signal from the base unit over that same channel. Similarly, while the handset unit is transmitting on the channel, the base unit is configured for receiving the signal from the handset unit. Due to the packetizing handling of voice data in these digital portable telephones, delays which result in echoes discernible by the user of the handset unit may be generated at certain packetizing rates of the voice data.

The effect of such echoes is minimized by employing an echo suppression arrangement such as is described in U.S. Pat. No. 5,381,475 which issued to M. C. Cavallo on Jan. 10, 1995. This suppression arrangement attenuates the reflected voice signal from the handset unit appearing in the base unit, and thereby prevents the sidetone echo from being coupled to and emanating at the handset unit. Although such arrangement effectively suppresses the echoes, it is desirable to design a simpler digital portable telephone which does not employ time division duplexing.

SUMMARY OF THE INVENTION

The prior art problem is solved in accordance with the present invention by a digital portable telephone which avoids the complex circuitry required to switch between transmit and receive states in the base unit and handset unit of the digital portable telephone while frequency hopping in a frequency hopping system.

In accordance with the invention, the architecture for this digital portable telephone provides improved performance over that of other digital portable telephones by combining the frequency hopping spread spectrum technique with other spread spectrum techniques in communications between the handset unit and the base unit of the portable telephone. Such other techniques are, in accordance with an aspect of the disclosure, delta modulation and signal redundancy in the transmission of the frequency hopped signal from the base unit to the handset unit and, similarly, from the handset unit to the base unit. These other forms of signal spreading are advantageously employed for providing additional processing gain and other benefits. Delta modulation, for example, spreads a transmitted signal in the manner of the rules promulgated by the FCC while not compromising voice quality. When the bit error rate in a signal increases, delta modulation is very forgiving of such bit errors and it is not necessary to blank the voice during reception of these errors. Signal redundancy in the transmission of the frequency hopped signal is achieved by configuring the circuit architecture of each unit in the portable telephone to transmit both sidebands of its frequency hopped signal. Such signal redundancy advantageously achieves a high level of immunity to interference from other portable telephones also operating in the same frequency hopping band. In addition, the circuit architecture is simplified and the cost for a portable telephone employing simplified circuits is less than a portable telephone employing circuitry for time division duplexing in a frequency hopping system.

BRIEF DESCRIPTION OF THE DRAWINGS

The invention and its mode of operation will be more clearly understood from the following detailed description when read with the appended drawing in which.

Throughout the drawing, the same element when shown in more that one figure is designated by the same reference numeral.

DETAILED DESCRIPTION

Figure 1:
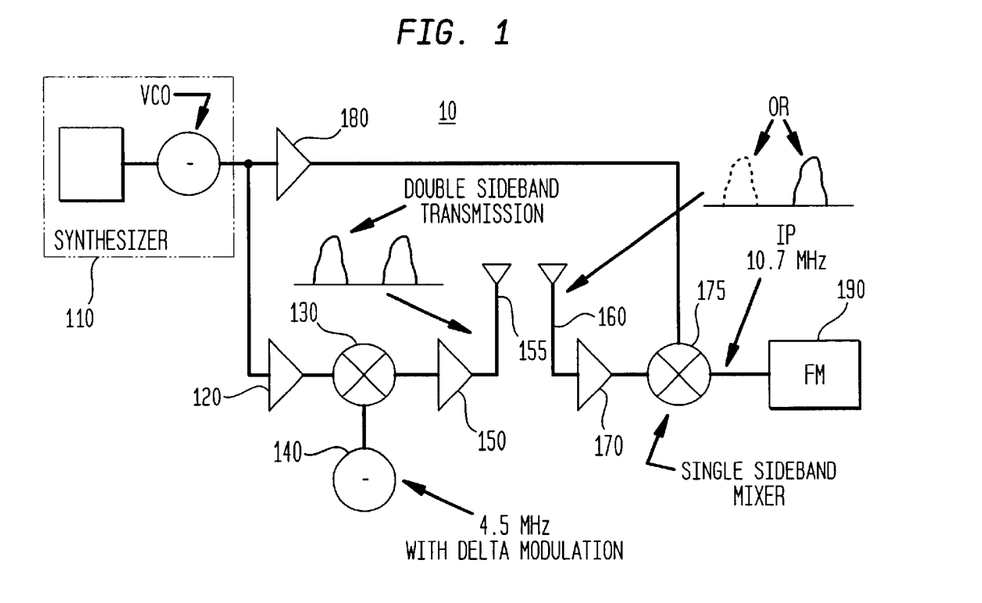
FIG. 1 shows a general block diagram of selected circuitry for a cordless telephone base unit, operative in accordance with the principles of the present invention.

Referring now to FIG. 1 of the drawing, there is shown a general block diagram of certain circuitry of a base unit 10 in a portable or cordless telephone. Both the base unit 10 and an associated handset unit 20 in the cordless telephone, described with reference to FIG. 2 later herein, are operable over a plurality of communication channels in a frequency hopping system.

A general overview of spread spectrum technology including frequency hopping systems is provided by R. C. Dixon, *Spread Spectrum Systems*, New York: John Wiley & Sons, 1984. The specific requirements for the frequency hopping system in which this cordless telephone is designed to operate are set forth in a Report and Order in General Docket No. 89–354, this Report and Order being adopted by the Federal Communications Commission (FCC) on Jun. 14, 1990 and released on Jul. 9, 1990.

The methods employed in the architecture for this cordless telephone conform to the FCC's processing gain requirement for high power communications in the Industrial, Scientific and Medical (ISM) bands. This architecture uses both frequency hopping and other forms of signal spread to achieve a processing gain greater than 17 dB. Specifically, delta modulation and a redundant transmission of the signal are the other forms of signal spreading that are employed for advantageously providing additional processing gain. Another attractive attribute of this architecture is a high level of immunity to interference by other cordless telephones also operating in the same ISM band. Finally, circuits are simplified and costs for a cordless telephone employing these simplified circuits are less than those employing time division duplexing.

The FCC permits a variety of unlicensed communication devices with up to one watt of power in the ISM bands. The primary band of interest for operation of the cordless telephone, in accordance with the disclosed embodiment, is in the 902–928 MHz band. Similarly, the cordless telephone may easily be configured for operation in the 2.40–2.48 GHz band, also in accordance with the disclosed embodiment.

In a hybrid rule (Part 15—Subpart C, i.e., 15.247) set forth by the FCC, a device operating in the ISM bands can use spread spectrum techniques, i.e., both frequency hopping and direct sequence, to achieve the minimum 17 dB of processing gain. The hybrid rule also requires that dwell time on any frequency not exceed 0.4 seconds and the spectral density of the spread signal not exceed 8 dBm in any 3 KHz bandwidth.

In the cordless telephone disclosed herein, slow frequency hopping among N>10 frequencies is employed. The advantage of such slow frequency hopping is that the frequency hopping control can be economically achieved in software by a microprocessor employed in both the base and handset units 10 and 20. Empirical results also have shown that a frequency hop is imperceptible to a cordless telephone user if the connection is muted for 3 ms while the frequency hop is executed. This implies that the radio frequency (RF) source must therefore be able to change frequency in about 1 ms, which is easily achieved.

Referring once again to FIG. 1, a single synthesized source, synthesizer 110, operates over the 902–928 MHz ISM band and provides the reference frequency signal for each one of the plurality of reference frequency channels used while the base unit is communicating in the frequency hopping system. Since this source is not required to be modulated, it is easily configured to change frequency in less than 1 ms and therefore achieve the desired 3 ms or less frequency hop mentioned herein above. The output of the synthesizer 110 is coupled to both the transmitter section of the telephone base and also the receiver section of the telephone base. The output from the synthesizer 110 is input into the transmitter section via an amplifier 120 and coupled from the amplifier 120 to a mixer 130. At the mixer 130, the reference frequency signal is mixed with a low level intermediate frequency (IF) signal from an oscillator 140 that is modulated with a delta modulated audio signal, in accordance with the disclosed embodiment and as described later herein.

In keeping with the approach to design a cordless telephone wherein the circuits therein are simplified and costs are low, the oscillator frequency for oscillator 140 in the base unit 10 is advantageously chosen to be 4.5 MHz, a common IF frequency where components are readily available. If 4.5 MHz is chosen for this oscillator in the base unit 10, then, in accordance with the disclosed embodiment, a different frequency is selected for a functionally equivalent oscillator in the handset unit 20. Thus 10.7 MHz, which is also a common IF frequency where components are readily available, may be selected for use in the handset unit 20. The level of the IF signal input into the mixer 130 is kept low so that harmonics are weak (20 dB suppressed is desirable).

The output of the double balanced mixer 130 is at the synthesizer frequency, for example 915 MHz, suppressed by the balance. There is also an upper and lower sideband 4.5 MHz away from the frequency output by the synthesizer 110. In accordance with the disclosed embodiment, both sidebands, are amplified by a power amplifier 150, passed through a simple harmonic filter (not shown), and sent to the antenna 155. Since each sideband contains all of the modulation, much is to be gained by this process. First, the cost of a filter normally used to select one sideband is avoided. Second, if the far end is receiving a selected primary sideband and it becomes corrupted by interference or undergoes a signal path fade, then the receiver section is easily configured to switch to and receive the redundant sideband, which also contains all of the information found in the primary sideband. Detection of interference and switching to the redundant sideband may be easily achieved through the teachings of U.S. Pat. No. 5,323,447 which modifies a frequency hopping sequence in the presence of interference.

It is to be noted that the 10.7 and 4.5 MHz frequencies are selected such that both sidebands are within the 26 MHz wide 902–928 MHz ISM band. Furthermore, the two times 10.7/4.5 MHz separation of the sidebands is larger than the correlation bandwidth for multipath fading and the "switched" frequency diversity provided by this simple technique provides a "gain" of more than 10 dB, i.e., transmitting ten times as much power, such gain being described in greater detail later herein. It is constructive to operate most of the circuits in the transmission section of the base unit in saturation. This improves efficiency and extends battery life. The "limiting" also suppresses amplitude noise on both sidebands.

If the transmitter section is operated in saturation or limiting, then it is preferable that the modulation of the 4.5 MHz source be a constant envelope. Since the simplest modulation is FM, either wide band FM or Frequency Shift Keying (FSK) modulation may therefore be employed in the design of the cordless telephone as the modulation method. Since the ISM band hybrid rules purportedly require that the signal exceed 500 KHz in bandwidth, 200 KHz binary FSK modulation with a deviation of +/−125 KHz is employed. This signal produces a relatively flat frequency spectrum 250 KHz wide. These two sidebands of at least 250 KHz bandwidth therefore meet the FCC's 500 KHz minimum bandwidth requirement.

With reference next to the architecture of the receiver section in the base unit 10, an antenna 160 couples its received signal through a simple band pass filter (not shown) and a low noise amplifier 170 to an image rejecting or single sideband mixer 175. This mixer 175 is described in greater detail later herein. The synthesizer 110 provides the reference frequency signal for mixer 175 by coupling this signal through an amplifier 180 to the mixer 175. The IF output from this mixer is 10.7 MHz at the base unit as previously described herein above. From the mixer 175, the received signal is coupled to an FM receiver integrated circuit 190 that is conventional and low in cost. The output from this integrated circuit 190 is an analog version of the 200 Kbps FSK baseband signal which is coupled to a microprocessor 910 for further processing, as described later herein with reference to FIG. 9. An integrated circuit that is usable as the FM receiver integrated circuit 190 is Part Number MC3361 which is readily available from manufacturers such as Philips, Motorola, Panasonic and Sanyo.

Figure 2:
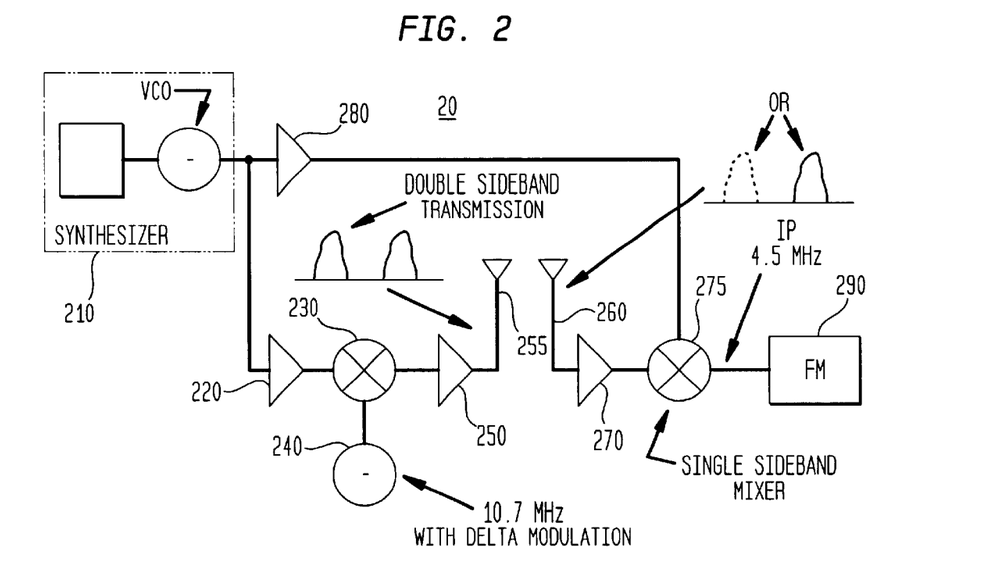
FIG. 2 shows a general block diagram of selected circuitry for a cordless telephone handset unit, operative in accordance with the principles of the present invention.

In FIG. 2 of the drawing, there is shown a general block diagram of certain circuitry of the cordless telephone handset unit 20 which, like the base unit 10, is operable over a plurality of communication channels in a frequency hopping system. The same basic components are used in implementing the circuit embodiment of FIG. 2 for the handset unit 20 and the circuit embodiment of FIG. 1 for the base unit 10. Because of this and the detailed description given the embodiment of FIG. 1, this handset unit embodiment will be described in similar detail only where the operation of the component sections differ substantially and sufficient clarity of operation might not be readily apparent from the description provided in the operation of the embodiment of the base unit 10.

Referring now to FIG. 2, a single synthesized source, synthesizer 210, operates over the 902–928 MHz ISM band and provides the reference frequency signal for each one of the plurality of reference frequency channels used while the handset unit is communicating in the frequency hopping system. The output of the synthesizer 210 is coupled to both the transmitter section of the telephone handset unit and also the receiver section of the telephone handset unit. The output from the synthesizer 210 is input into the transmitter section via an amplifier 220 and coupled from the amplifier 220 to a mixer 230. At the mixer 230, the reference frequency signal is mixed with a low level intermediate frequency (IF) signal from an oscillator 240 that is modulated with a delta modulated audio signal, in accordance with the disclosed embodiment and as described later herein.

The oscillator frequency for oscillator 240 in the handset unit 20 is advantageously chosen to be 10.7 MHz, a common IF frequency where components are readily available. The level of the IF signal input into the mixer 230 is kept low so that harmonics are weak (20 dB suppressed is desirable).

The output of the double balanced mixer 230 is at the synthesizer frequency, for example 915 MHz, suppressed by the balance. There is also an upper and lower sideband 10.7 MHz away from the frequency output by the synthesizer 210. In accordance with the disclosed embodiment, both sidebands, are amplified by a power amplifier 250, passed through a simple harmonic filter (not shown), and sent to the antenna 255. In the same manner as in the base unit 10, FSK modulation is employed in the handset unit as the modulation method of the 10.7 MHz source for the IF frequency signal.

With reference next to the architecture of the receiver section in the handset unit 20, an antenna 260 couples its received signal through a simple band pass filter (not shown) and a low noise amplifier 270 to an image rejecting or single sideband mixer 275. The synthesizer 210 provides the reference frequency signal for mixer 275 by coupling this signal through an amplifier 280 to the mixer 275. The IF output from this mixer is 4.5 MHz at the handset unit as previously described herein above. From the mixer 275, the received signal is coupled to an FM receiver integrated circuit 290. The output from this integrated circuit 290 is an analog version of the 200 Kbps FSK baseband signal which is coupled to a microprocessor 1010 for further processing, as described later herein with reference to FIG. 10. An integrated circuit that is usable as the FM receiver integrated circuit 290 is Part Number MC3361 which is readily available from manufacturers such as Philips, Motorola, Panasonic and Sanyo.

Figure 3:
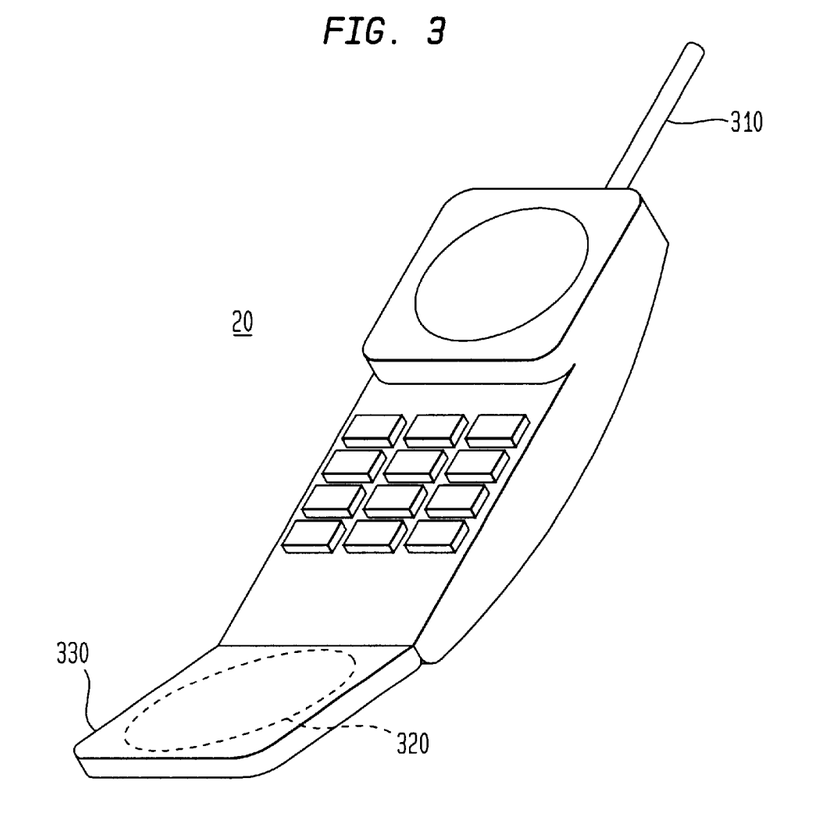
FIG. 3 shows a receive monopole antenna and a transmit orthogonal magnetic antenna deployed in the handset unit of the cordless telephone, in accordance with the principles of the present invention.
Figures 4A, 4B:
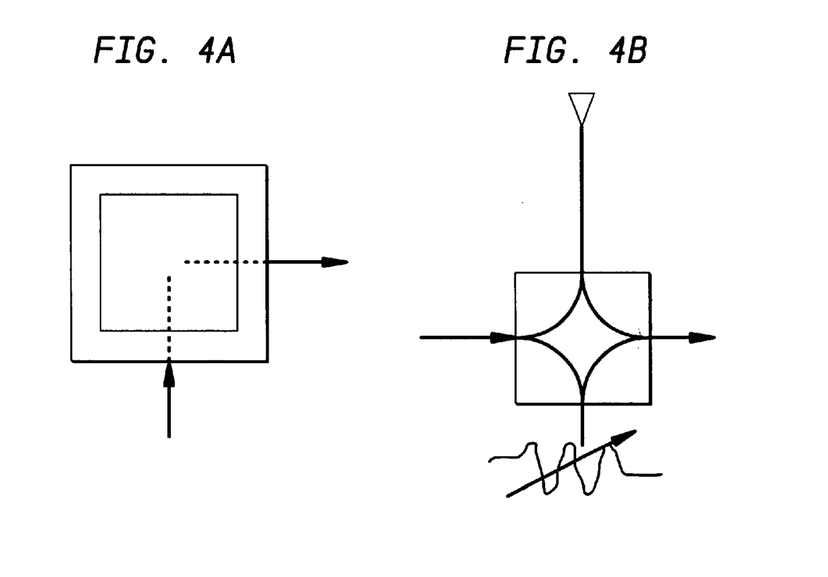
FIGS. 4A and 4B respectively show two optional antennas that are usable in the cordless telephone, in accordance with the principles of the present invention.

The transmitted signal generated in the transmit sections of both the base unit 10 and the handset unit 20 hops over the entire ISM band. Without time division duplexing or elaborate filtering, the potential for the different unwanted signals across the band to enter the receiver sections of these two units would be high if only a single antenna were used. Thus, separate transmitting and receiving antennae are employed in both the base unit 10 and the handset unit 20 for obtaining diversity between the transmitted and received signals in these units. To prevent overload of the receiver section and prevent transmitter noise from desensing the receiver, a separate receiver antenna that is isolated from the transmitting antenna by distance and cross polarization is used. Shown in FIG. 3 is one design concept illustratively deployed in the handset unit 20 with a receive monopole antenna 310 extending above the acoustic receiver portion of the handset unit and a transmit orthogonal magnetic loop antenna 320 in the "flip" portion 330 of the handset unit. More flexibility as to the positioning of the two separate antennae for obtaining diversity at the base unit is available because of its generally larger size and stationary configuration. Two other antenna concepts are shown in FIGS. 4A and 4B and are usable with the cordless telephone. FIG. 4A is a "1×1" patch antenna for the 1.9 GHz PCS band and has achieved 30–50 dB of isolation between the cross poled operating modes. FIG. 4B is a 900 MHz antenna coupled through a 3 dB hybrid and has achieved a typical isolation greater than 30 dB with tuning.

Figure 5:
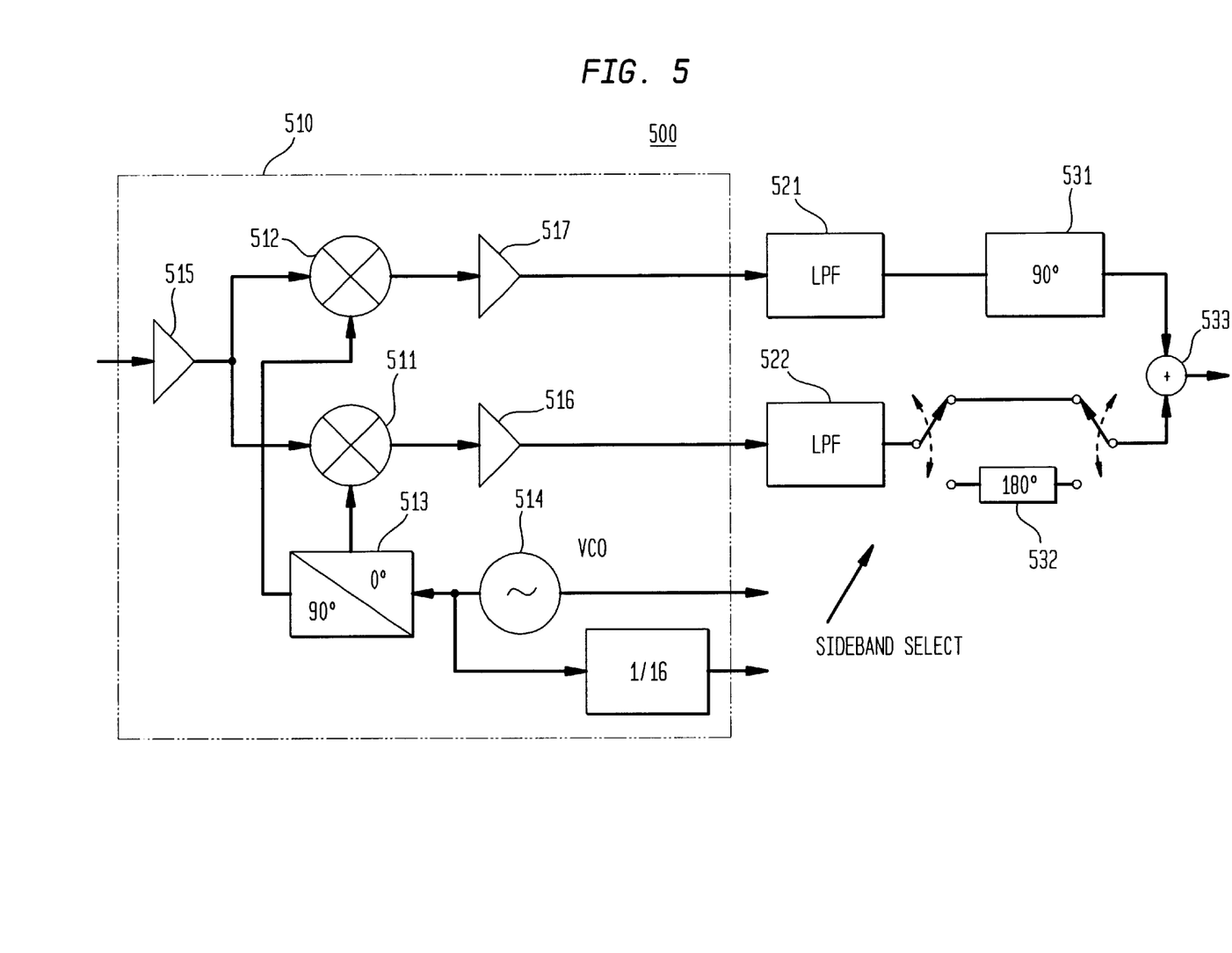
FIG. 5 shows a high level circuit diagram of a single sideband or image rejecting mixer, in accordance with the principles of the present invention.

Referring next to FIG. 5, there is shown a high level circuit diagram of a single sideband or image rejecting mixer 500 suitable for use as sideband mixers 175 and 275 respective shown in FIGS. 1 and 2. This mixer 500 contains two mixers 511 and 512 with mixer 512 being driven 90 degrees out of phase by a phase shifter 513 with respect to mixer 511. A voltage controlled oscillator (VCO) 514 provides the reference signal for the mixer 500. This VCO 514 may be part of the synthesizer 110 shown in FIG. 1 or otherwise synchronized to this synthesizer in some manner. The 900 MHz received signal into the mixer 500 is amplified by amplifier 515 and coupled to each of the mixers 511 and 512. If the frequency of the VCO 514 is 915 MHz and the received signal is 915 MHz with +/−10.7 MHz sidebands, then the low frequency product out of each mixer 511 and 512 is at 10.7 MHz. The output of mixer 511 is amplified by amplifier 516 and the output of mixer 512 is amplified by amplifier 517. This low frequency product is selected by low pass IF filter 521 which is connected to amplifier 517, and low pass IF filter 522 which is connected to amplifier 516. Alternatively, band pass filters may be substituted for these low pass filters. By phase shifting one IF signal, for example, the IF signal from mixer 512, by 90 degrees in phase shifter 513 and then adding the two IF signals together in summer 533, this mixer 500 receives one sideband. By subtracting the signals, such as is achieved by phase shifting the signal from mixer 511 in phase shifter 532, the mixer 500 receives the other sideband. By balancing the gains and controlling the phase shifts, Sideband rejection of 30–65 dB is readily achievable. This level of rejection is sufficient to prevent the unwanted sideband, whether from the locally generated transmitted signal or from interference, from corrupting the wanted sideband.

Although this single sideband or image rejecting mixer 500 may be constructed out of smaller sub-circuits as shown and described, the I and Q demodulator circuit 510 may be obtained in a standard integrated circuit used in digital communications. Such a circuit is commercially available from Mini-Circuits as Part No. MIQA-10D. Other integrated circuit suppliers such as Maxim, Philips and Plessey also manufacture an I and Q demodulator suitable for use as demodulator circuit 510.

Figure 6:
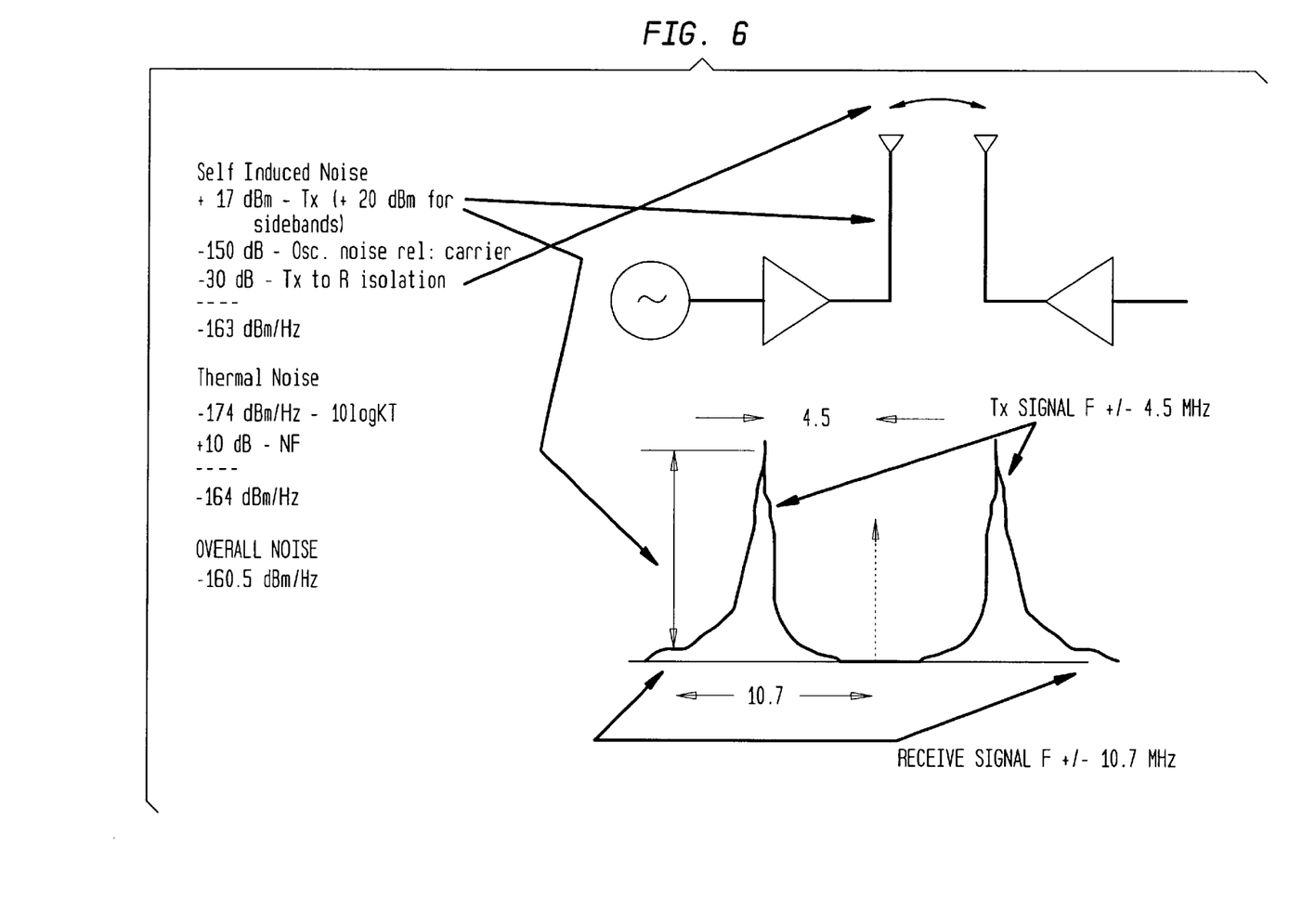
FIG. 6 shows the receiver noise analysis for the cordless telephone, in accordance with the principles of the present invention.

With reference now to FIG. 6, there is shown a receiver noise analysis for the cordless telephone. A consideration for implementation of the architecture for the cordless telephone is receiver desensing due to wideband noise from the transmitter. In this architecture "wideband" means noise that is, for example, 10.7 MHz offset from the transmitted signal with two 4.5 MHz offset sidebands. By way of illustrative example and by reference to FIG. 6, an assumption is made that the transmitter is +20 dBm (100 mw) with +17 dBm in each 4.5 MHz sideband and that the noise/Hz is −150 dBc at the 10.7 MHz offset frequency. This level of noise is achievable in an oscillator which has a resonator with a loaded Q on the order of 50, a readily achievable value. Since oscillator noise is rarely specified so far from the carrier, a $f^2$ law for the noise is assumed. Thus an oscillator with a noise of −90 dBc @ a 10 KHz offset from the carrier has sufficient quality. This performance at 10 KHz offset is advertised by many manufacturers of VCOs. With 30 dB of isolation between the two antennae, the noise into the receiver is 163 dBm/Hz. This is slightly above the receiver noise floor when an overall noise figure of 10 dB is assumed.

Figure 7:
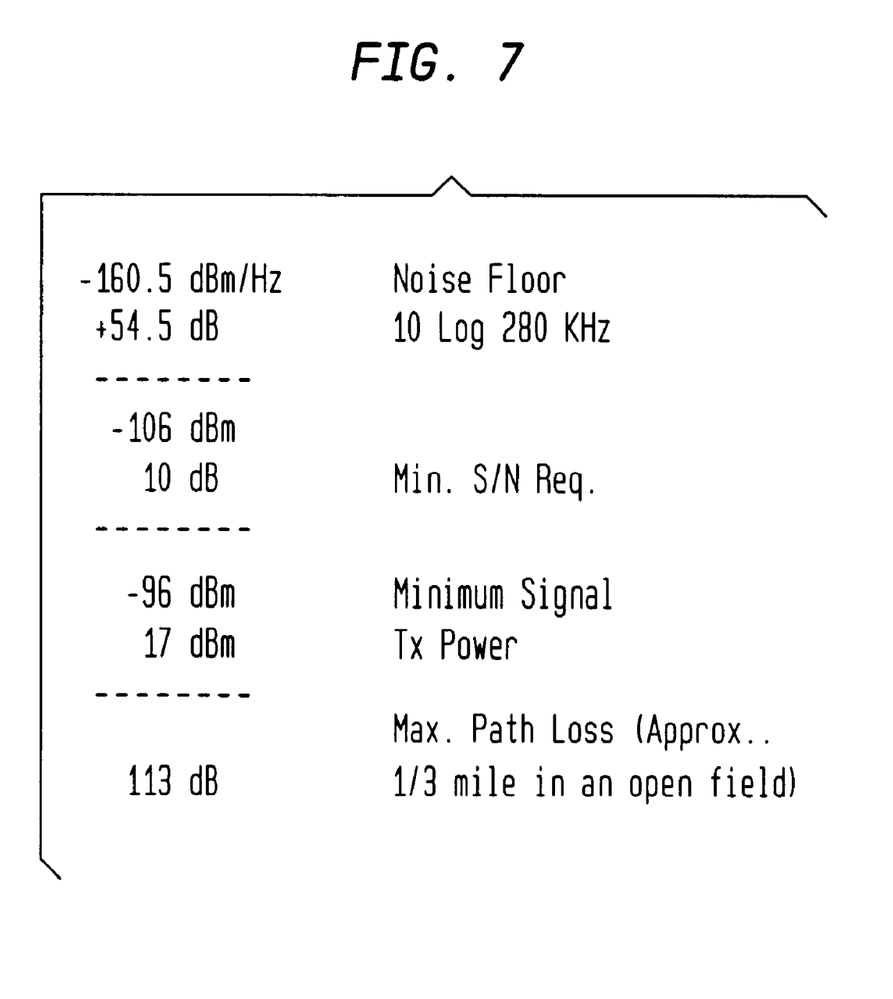
FIG. 7 shows the overall link budget analysis based upon the overall computed noise floor analysis illustrated in FIG. 6, in accordance with the principles of the present invention.

FIG. 7 shows the overall link budget analysis based upon the overall computed noise floor as illustrated in FIG. 6. This analysis shows that a path loss of 113 dB is tolerated as long as the digital demodulator operates with a minimum signal to noise ratio of 10 dB ( i.e., 5 dB theoretical for a bit error rate (BER)=0.1 and 5 dB implementation margin). This path loss corresponds to an open field range of ⅓ of a mile at 900 MHz (or half that distance at 2.4 GHz).

Figure 8A:
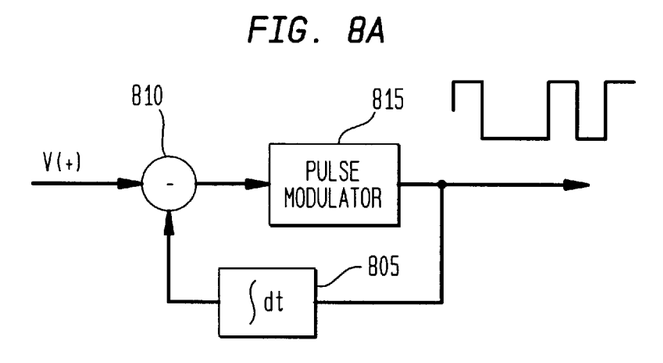
FIGS. 8A through 8E show a delta modulator, a delta sigma modulator and integrators for use in these modulators, in accordance with the principles of the present invention.
Figure 8B:
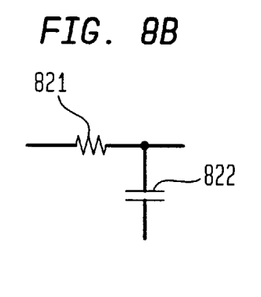
Figure 8C:
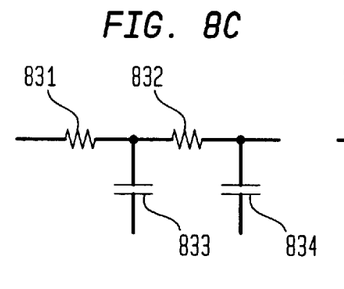
Figure 8D:
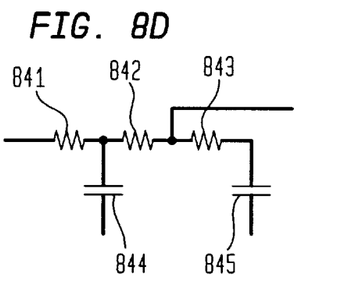
Figure 8E:
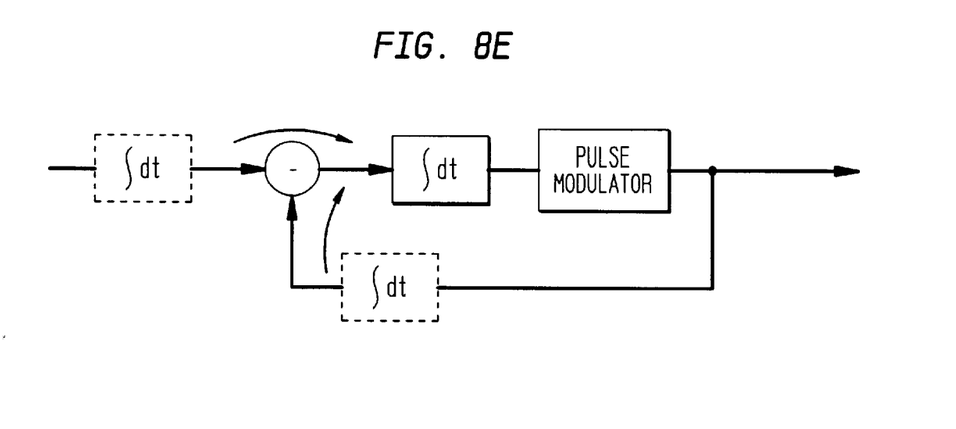

Delta modulators are shown in FIG. 8A and 8E. In accordance with the disclosed embodiment, delta modulation is recognized to spread the transmitted signal in a manner to conform with the FCC's mandate of a spread spectrum signal while not compromising voice quality. In FIG. 8A, an input waveform V(t) is compared to the output of an integrator 805 at a difference node 810. If the waveform V(t) is larger than the output of a pulse modulator 815 when a sampling clock strobe provided by an internal clock (not shown) occurs, the pulse modulator 815 generates a positive unit pulse an sends it both to the far end and back into the integrator 805. At each clock strobe, the unit positive pulses continue until the output of the integrator 805 exceeds V(t) whereupon the pulse modulator 815 produces negative pulses. In equilibrium the pulse modulator produces +1,−1,+1,−1,+1,−1 or ignoring a DC shift, 1,0, 1,0, 1,0. Therefore, each bit or impulse is a small differential correction to the integrator estimation of the signal. There is no "most significant bit" and thus any bit error causes a small error and there are no loud "pops" as with most digital encoding. This makes delta modulation very forgiving of bit errors and it is not necessary to blank the voice when the BER increases. From empirical results it has been determined that the delta modulated voice signal is quite intelligible with a BER as high as 10% and it degrades much like analog FM.

Integrators for the delta modulator shown in FIG. 8A are quite simple. Integrators shown in FIGS. 8B through 8D are all usable in this delta modulator. The single resistor-capacitor (RC) integrator shown in FIG. 8B and comprising resistor 821 and capacitor 822 produces a staircase approximation of V(t) at the output of the integrator 805 and a signal to quantizing noise (S/N) given by:

$$(S/N) = 1.5(f_2/2f_m)^3(f_m/f\pi)^2 \quad f - \text{frequency of a sine wave representing an input signal}$$

$$f_m - \text{maximum frequency of the input signal}$$

$$f_s, - \text{sampling frequency}$$

$$= 48.5 \text{ dB for } f = 800 \text{ Hz approximating voice,}$$

$$f_m = 3.3 \text{ KHz,}$$

$$f_s, = 200 \text{ KHz.}$$

The double integrators shown in FIG. 8C, comprising resistors 831 and 832 and capacitors 833 and 834, and in FIG. 8D, comprising resistors 841, 842 and 843 and capacitors 844 and 845, produce a ramp approximation of V(t) with substantially less quantizing noise for the same values of the parameters.

$$(S/N) = 1.5(f_s/2f_m)^5(f_m/f\pi)^4$$

$$= 80.5 \text{ dB}$$

Modulation through use of the delta sigma modulator shown in FIG. 8E is substantially equivalent to delta modulation with the integral of V(t) replacing V(t) as the input. Integrators shown in FIGS. 8B through 8D are all usable in this delta sigma modulator. As shown in FIG. 8E, moving both integrators through the difference node replaces both integrators with one and simplifies the modulator circuit. The signal to quantizing noise expression becomes independent of (f) and this modulator is noted for better performance with signals having a lot of high frequency content.

$$(S/N) = 4.5/\pi^2(f_2/2f_m)^2 \quad \text{for a signal amplitude at the maximum that does not overload}$$

-continued

= 41.0 dB

A more detailed treatment of the above modulation techniques is found in *Modulation Noise And Spectral Analysis Applied to Information Transmission*, Chapter 22, by Philip F. Panter, McGraw-Hill, 1965.

Not only is the encoding achieved through a simple circuit, the decoding at the far end is similar achieved in a simple circuit after recovery of the bit stream. For decoding a signal, all that is necessary is to convert the received bits into unit pulses and apply them to the same integration circuit used in the encoding. Thus, the encoder and decoder may be implemented with a few resistors, capacitors, operational amplifiers and at least one F type flip flop. The encoder and decoder may also be implemented through use of delta modulation integrated circuits. Examples of such circuits are Part No. HC55536 available from Harris Corporation and Part No. MC3417 available from Motorola Semiconductor Products. Because microprocessors ($\mu$Ps) have become so economical today, however, a reasonable alternative to save cost and circuitry is to implement the encoding, decoding and bit recovery in a microprocessor.

Figure 9:
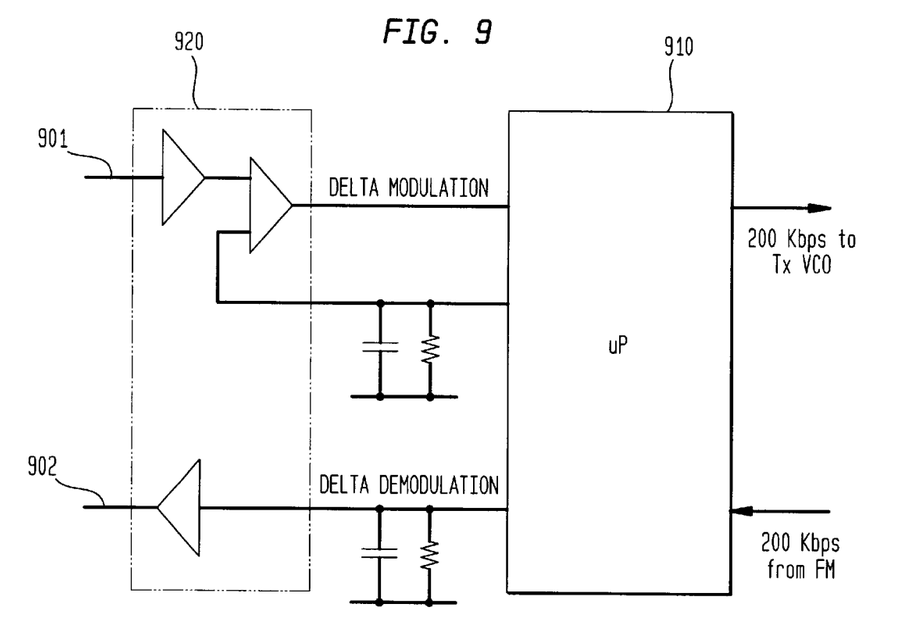
FIG. 9 shows a high level circuit for single integration delta modulation suitable for use in the base unit, in accordance with the principles of the present invention.
Figure 10:
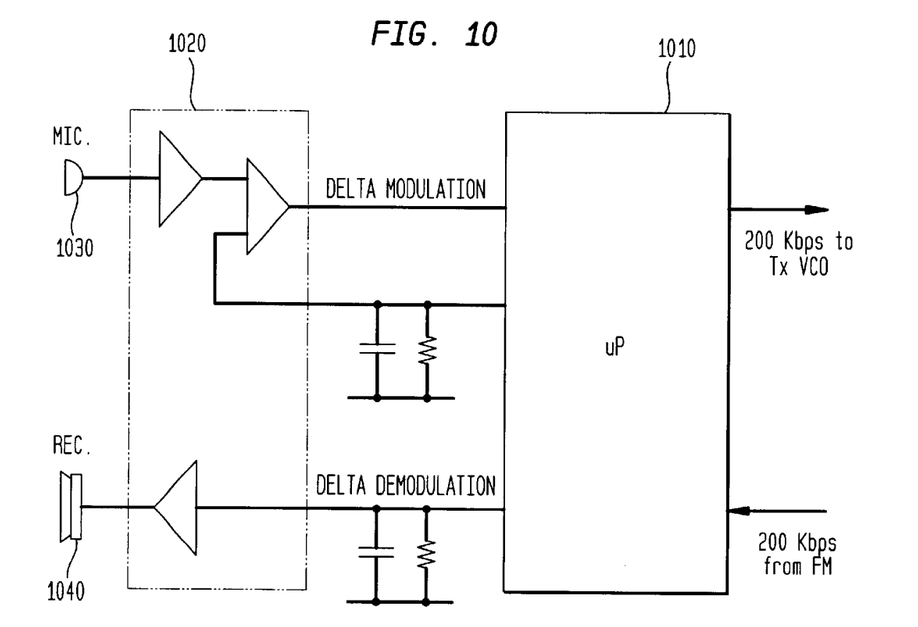
FIG. 10 shows a high level circuit for single integration delta modulation suitable for use in the handset unit, in accordance with the principles of the present invention.

Referring next to FIGS. 9 and 10, in combination, there are shown high level circuits for single integration delta modulation suitable for use respectively in the base unit 10 and the handset unit 20. The delta modulation encoding and decoding is a trivial operation for a microprocessor employed in these two high level circuits. With specific reference to FIG. 9, a microprocessor 910 receives the 200 Kbps signal from the FM receiver integrated circuit 190 (FIG. 1) and transmits a 200 Kbps signal to the oscillator 140 (FIG. 1). A plain old telephone service (POTS) circuit 920 is configured with the necessary circuitry for connecting the microprocessor 910 to a central office or other appropriate switch through tip and ring lines 901 and 902.

In FIG. 10, a microprocessor 1010 receives the 200 Kbps signal from the FM receiver integrated circuit 290 (FIG. 2) and transmits a 200 Kbps signal to the oscillator 240 (FIG. 2). A telephone circuit 1020, which includes a hybrid and other well-known telephone circuitry, connects the microprocessor 1010 to both a microphone 1030 for receiving audio signals and to a speaker 1040 for reproducing audio signals received from the FM receiver integrated circuit 290. Audio signals are any and all speech signals generated by a user of the handset unit. Audio signals are also those data signals that may be coupled from a data terminal into a portable unit such as handset unit 20 for communicating through base unit 10 to another data terminal in the telephone network.

The microprocessor 910, and similarly microprocessor 1010, advantageously provides a number of control functions and may be implemented through the use of a microprocessor along with read-only-memory (ROM), random-access-memory (RAM) and through use of the proper coding. Such a microprocessor is known in the art and is readily available from semiconductor manufacturers such as Microchip Technology, Inc., Motorola, Signetics, Intel and AMD. For example, a microprocessor available from Microchip Technology, Inc. as part number PIC 16C54 is usable as microprocessors 910 and 1010 with the proper programming.

One control function provided by the microprocessors 910 and 1010 is to provide the frequency and timing recovery needed in the receiver section of the base unit 10 and the handset unit 20 of the cordless telephone. For convenience, the handset unit may be configured as the master timing reference for establishing the sampling frequency. The microprocessor 1010 may sample the input signal at the same time as the encoded stream is clocked out. In the base unit 10 where there is more room and available power, the microprocessor 910 is tasked with recovering timing from the signal received from the handset unit 20. The base unit 10 then clocks out its encoded bit stream at this slaved timing rate and sends it to the handset unit 20. Since the bit period for 200 Kbps sampling is 5 $\mu$S and the round trip delay for this cordless telephone assuming a ⅓ mile range is less than 0.4 $\mu$S, it is not necessary for the handset unit to track timing.

Figure 11:
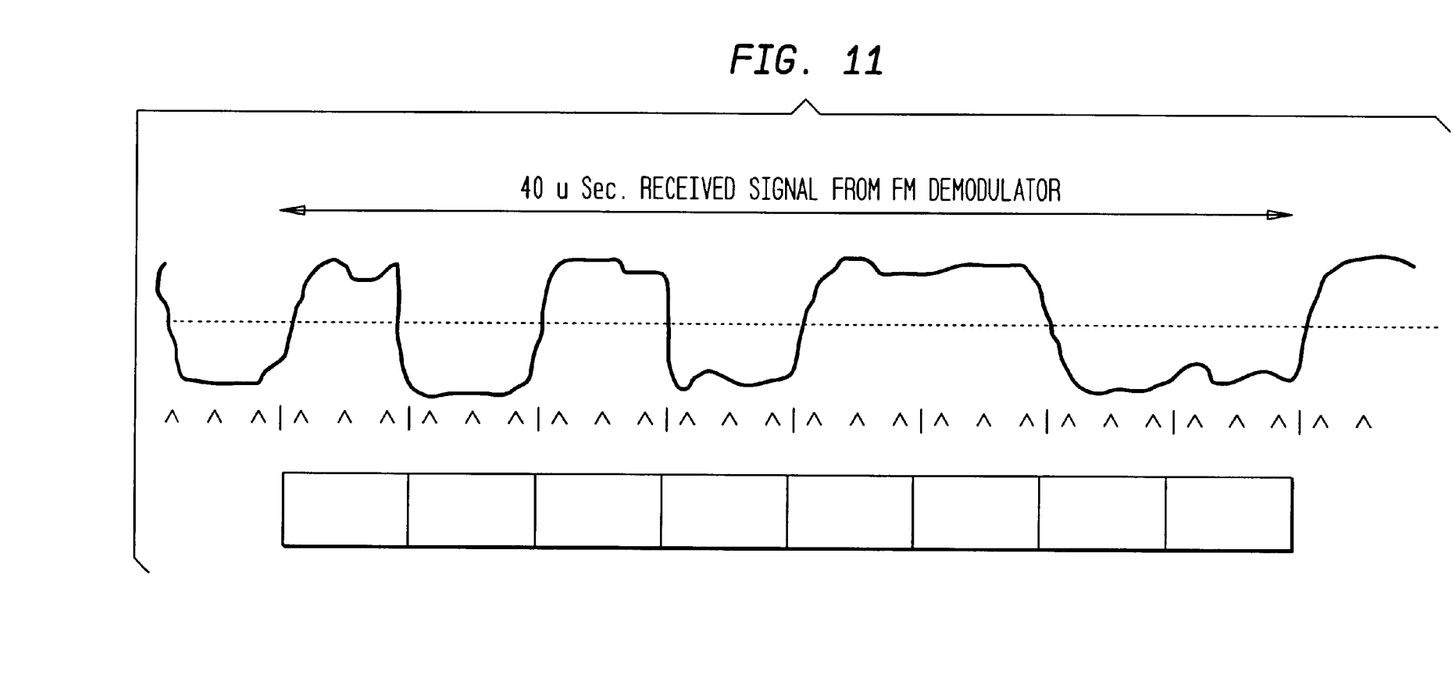
FIG. 11 shows a first method to do timing recovery and deteriorated signal detection in the base unit and handset unit of the cordless telephone, in accordance with the principles of the invention.

Another control finction provided by microprocessors 910 and 1010 is to determine if there is a fade of or interference to the incoming signal and then instruct its associated receiver section to switch from the selected primary sideband to the redundant sideband. Similarly, the microprocessor may instruct its associated receiver section to switch from the redundant sideband back to the primary sideband if such fade or interference appears on the redundant sideband while it is being used to detect the incoming signal. One method to do timing recovery and deteriorating signal detection is shown in FIG. 11. In this arrangement, the microprocessor over samples the input wave form at three times the sampling rate or illustratively 600 Kbps in this example. The statistic "D" is computed and represents the exclusive OR of the over sampled triplets being summed eight times. If the system is in synchronization and the signal is strong then each triplet will be "1,1,1" or "0,0,0" and the exclusive OR is "1." And the sum of eight ORed triplets is 8 in this example. The statistic D is computed many times to remove any dependency on the data pattern. Such operation is necessary since this statistic fails to indicate synchronization if the data were all "ones." If the triplet pattern were, for example, 110,001,110,110,001, then it can be inferred that sampling needs to be shifted to the right or delayed. The rate at which this shifting has to be provided is an indication of frequency error. To reduce such frequency error, in this case D=0, the microprocessor simply pulls or adjusts a timing crystal (not shown) associated therewith.

A simple calculation indicates that D=2 if the signal is all noise and D=5.8 if the system is in synchronization But if the bit error rate (BER) equals 0. 1, this is a threshold to switch sidebands. If the receiver indicates that the data stream is all "ones" or all "zeroes" then this suggests that the receiver 290 has been captured by an interfering signal that is higher or lower than the desired carrier. Thus the statistic "D" and the received data provide the desired information on the state of the communications.

Figure 12:
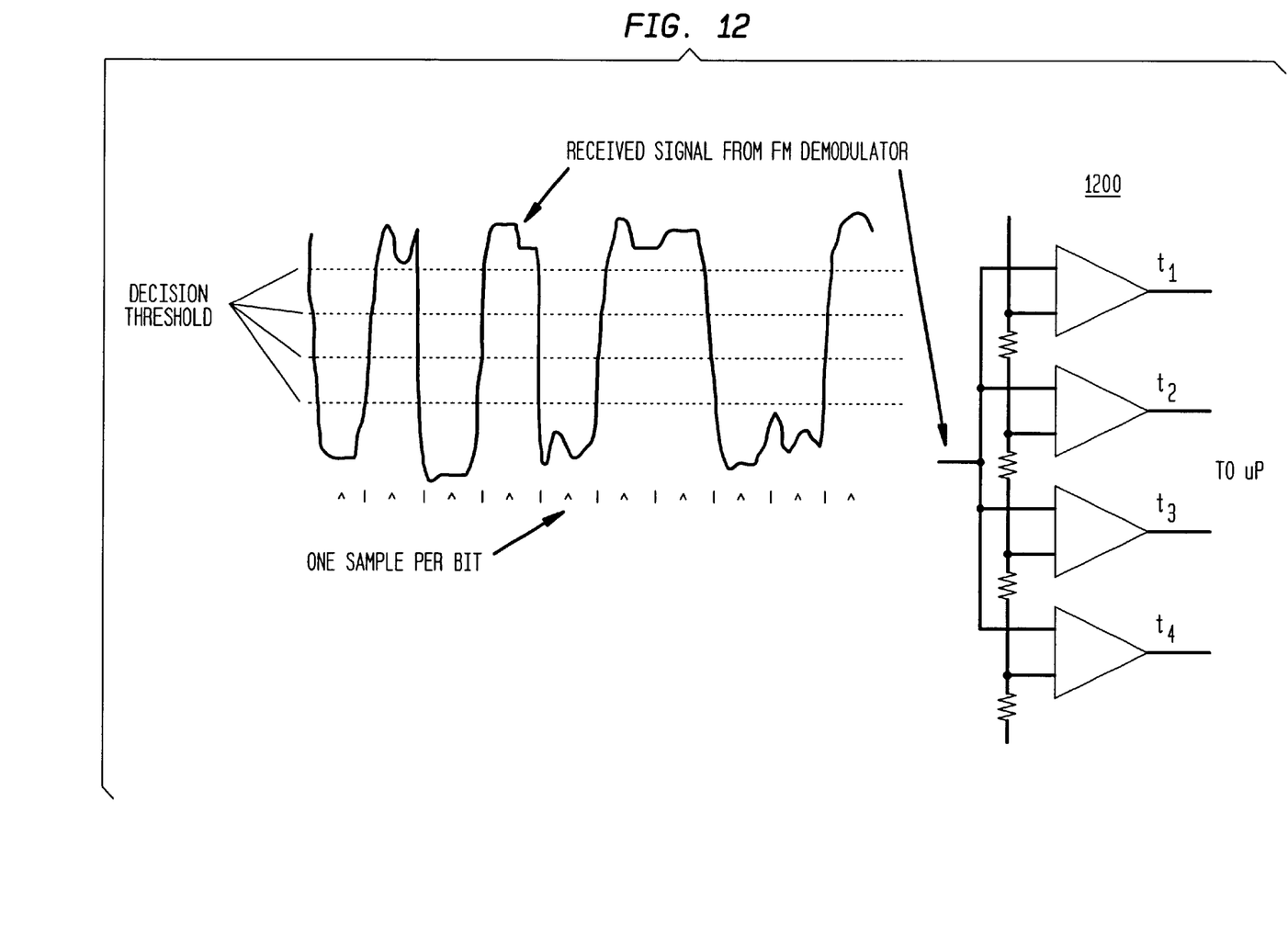
FIG. 12 shows a second method to do timing recovery and deteriorated signal detection in the base unit and handset unit of the cordless telephone, in accordance with the principles of the present invention.

Another method to do timing recovery and deteriorating signal detection is shown in FIG. 12. This method does not require the microprocessor to run as fast, but to do more processing in parallel. In this arrangement, a low cost "Flash analog-to-digital A/D)" converter 1200 is fashioned from a quad comparator IC. Four thresholds (T=$t_1$, $t_2$, $t_3$, $t_4$) to measure signal quality or a form of "eye opening" are established. If the communications link between the handset unit and the base unit is comprised of a good signal, this signal is synchronized and the synthesizers are on frequency, i.e. centered in the FM discriminator S curve. The signal samples should thus be above the upper threshold or below the lower threshold, i.e., there are strong "ones" (T=1,1,1,1) and "zeroes" (T=0,0,0,0) to be in synchronizationand have a good BER. If the AID converter output starts to have many occurrences of being between thresholds 1 and 2 or 3 and 4, then it can be inferred that the sampling has drifted off the center of the bits. In such a case, where T=0,1,1,1 or T=0,0,0,1, synchronization is being lost, but a good BER is being maintained. If the A/D converter output has outputs above threshold 1 and between thresholds 3 and 4 then the carrier frequency is too high. If the output is always above threshold 1 then the receiver may have been captured by interference higher in frequency than the desired carrier. If there are frequent occurrences of all states then the signal possibly may be lost in noise or there is strong interference. Thus, this method also provides the desired information on the state of the communications.

When the input to the delta modulator is not changing then the encoded binary signal will be 1,0,1,0,1,0,1,0. This simple pattern may produce a frequency spectrum that is not sufficiently random in appearance and such state may occasionally occur. One method to address this is to have the microprocessor detect this condition and randomly substitute other "no change" patterns that will make no difference to the decoded voice. Examples of some no change patterns are: 0,0, 1, 1,0,0,1, 1,0,0 and 1,0,1, 1,0,1,0,0. For convenience and ease of implementation, these are 8 bit patterns with equal numbers of ones and zeroes. This delta modulation encodes voice and the I Kbps in band signalling used in existing cordless telephones thus permitting the use of existing signalling algorithms as described in U.S. Pat. No. 4,731,814. An alternative is to insert a key pattern for informing the far end that the data to follow is signalling data. One "no change" pattern may be reserved for this key. For example, if the pattern 0,0,1,1,0,0,1,1,0,0 were to occur in voice transmission then it could be trapped and another "no change" pattern substituted. This would be undetectable in the voice signal. If this pattern was forced by the microprocessor then the far end would know that data follows.

Figure 13:
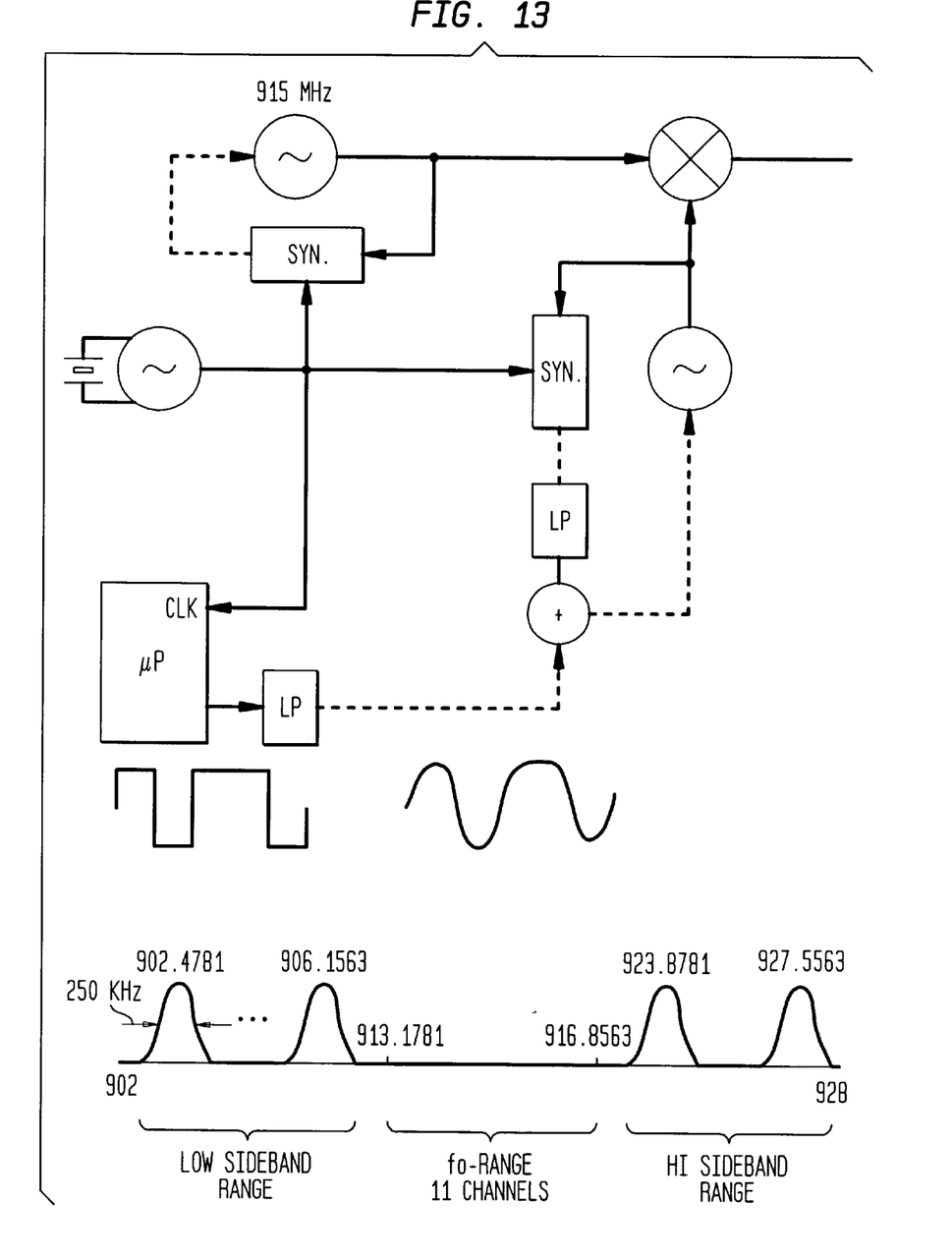
FIG. 13 shows a frequency plan that produces a number of frequency channels usable by the base unit and handset unit in frequency hopping in a frequency hopping system, in accordance with the principles of the present invention.

The FCC's hybrid rule for the ISM bands requires at least 17 dB of processing gain through spread spectrum techniques. The first type of processing gain in this cordless telephone is provided by frequency hopping. In accordance with the disclosed embodiment, the base unit 10 and handset unit 20 are configured to frequency hop at random among some number of frequency channels greater than 10, this frequency hopping pattern being determined by a pseudo-random data list. The processing gain of this frequency hopping is 10 log 10=10 dB or greater. A frequency plan that produces, by way of example, 11 frequencies separated by 334 KHz is shown in FIG. 13.

For convenience, the microprocessor 910 in the base unit 10 generates and stores pseudo-random seeds from which a pseudo-random data list is generated. Although the microprocessor in the base unit is typically selected to generate the data list, it is to be understood that such data list may also be generated in the handset unit 20 as well. It is also to be understood that random data lists may be generated in a pseudo-random manner in accordance with the teaching of S. W. Golomb in *Digital Communications With Space Applications*, New Jersey: Prentice-Hall 1964 pp. 7–15.

The generated pseudo-random data list has a group of 11 data values which correspond to a set of 11 random frequency channels. These channels are selected from the 902–928 MHz frequency band and used during a frequency hopping cycle executed by the base unit 10 and the handset unit 20. A subset of these channels is also used during an initialization process executed by the base unit and handset unit in order to start frequency hopping. An initialization process suitable for use in the embodiment disclosed herein is described in U.S. Pat. No. 5,353,341.

Any communications between the base unit 10 and the handset unit 20 must be accompanied by a security code then shared between them. During the establishing of initial communications between the handset unit 20 and the base unit 10 initiated by the base unit 10, the microprocessor 1010 must be able to make a favorable comparison of the received security code data with its stored security code data. Similarly, a favorable comparison of the data from the two security codes also must be made by microprocessor 910 in order for the base unit 10 to respond to a call set-up request from a handset unit. A security code sharing process suitable for use in the embodiment disclosed herein is described in U.S. Pat. Nos. 4,736,404 and 4,731,814.

Another type of spread spectrum communication with a processing gain that is employed in the cordless telephone is delta modulation, in accordance with the invention. Empirically, it has been determined that delta modulation with a high sampling frequency performs well with a BER as low as 01 while all other "efficient" voice codecs require at least a BER=0.001 to deliver comparable performance. If one were communicating over a Gaussian channel, a non-coherent FSK system requires a S/N of 4 dB for BER=0.1 and 11 dB for a BER=0.001. Such performance is described in *Modulation, Noise, and Spectral Analysis Applied to Information Transmission*, by Philip Panter, McGraw-Hill, 1965, page 722. This is 7 dB of processing gain. The processing gain is greater over an actual radio channel, one with Rayleigh statistics due to multipath propagation. For a Rayleigh channel a S/N ratio of 9 dB is required for BER=0.1 and 30 dB is required for BER=0.001. This is a 21 dB processing gain. Such performance is described in *Digital Communications* by John G. Proakis, McGraw-Hill, 1995.

More processing gain is provided in the cordless telephone, in accordance with the disclosed embodiment, from the additional signal spread derived from the complete signal redundancy in the two sidebands that are transmitted. In the operation of the cordless telephone, one or the other of the two transmitted sidebands are received providing for a switched or selection, frequency diversity. *In Microwave Mobile Communications* by William. C. Jakes, IFFF Press 1974, page 315, the results of two branch versus one branch selection diversity for a Rayleigh channel and a system operation at a 99% reliability level are presented. Jakes shows that this simple diversity produces a "processing gain" of 10 dB.

The combination frequency hopping, delta modulation and signal redundancy in the transmission of the frequency hopped signal in a cordless telephone produces 27 to 38 dB of "processing gain" over, for example, a cordless telephone using 64 Kbps PCM voice encoding and transmission over a single narrow radio channel with no frequency hopping. What has been described is merely illustrative of the present invention. Various other modifications of this invention are contemplated and may obviously be resorted to by those skilled in the art without departing from the spirit and scope of the invention as hereinafter defined by the appended claims.

I claim:

1. A cordless telephone comprising:
   a base unit connectable to a telephone line, the base unit including a first transmitter and a first receiver;
   a handset unit for communicating with the base unit over any one of a plurality of communication channels in a frequency hopping system, the handset unit including a second transmitter and a second receiver for respectively transmitting to the first receiver and receiving from the first transmitter in the base unit;
   delta modulation circuitry for encoding audio signals in said base unit and said handset unit, said audio signals being encoded for transmission by said first and second transmitters for reception respectively by said second and first receivers; and
   intermediate frequency circuitry in said base unit and handset unit for modulating a reference frequency signal used for communicating over one of said plurality of communication channels, said intermediate frequency circuitry employing a first intermediate frequency signal for modulating said reference frequency signal for transmission by said first transmitter and a second intermediate frequency signal for modulating said reference frequency signal for transmission by said second transmitter, said reference frequency signal operating at substantially the same frequency in both the handset unit and the base unit, said first intermediate frequency signal and said second intermediate frequency signal are different frequencies for simultaneous transmission and receptions; wherein both said base unit and handset unit include frequency diversity circuits for transmitting both an upper and a lower sideband signal on each one the plurality of communication channels during a frequency hopping sequence for said handset and base units, said sideband signals being indicative of encoded audio signals being transmitted by both said handset and base units.

2. The cordless telephone as in claim 1 wherein encoded audio signals from the delta modulation circuitry are provided to said intermediate frequency circuitry for modulating said first intermediate frequency signal and said second intermediate frequency signal.

3. The cordless telephone as in claim 2 wherein said delta modulation circuitry decodes the audio signals encoded for transmission by said first and second transmitters when said encoded audio signals are received respectively by said second and first receivers.

4. The cordless telephone as in claim 1 wherein said first transmitter is connected to a first transmit antenna and said first receiver is connected to a first receive antenna.

5. The cordless telephone as in claim 4 wherein said first transmit antenna and said first receive antenna are separated by distance and polarization for achieving antenna diversity.

6. The cordless telephone as in claim 4 wherein said second transmitter is connected to a second transmit antenna and said second receiver is connected to a second receive antenna.

7. The cordless telephone as in claim 6 wherein said second transmit antenna and said second receive antenna are separated by distance and polarization for achieving antenna diversity.

8. A method of operation for a cordless telephone comprising the steps of:
   configuring both a base unit and a handset unit in the cordless telephone for communicating over any one of a plurality of communication channels in a frequency hopping system, the base unit being connectable to a telephone line and including a first transmitter and a first receiver for respectively transmitting to a second receiver and receiving from a second transmitter in the handset unit;
   encoding audio signals in delta modulation circuitry in said base unit and said handset unit, said audio signals being encoded for transmission by said first and second transmitters for reception respectively by said second and first receivers; and
   modulating in intermediate frequency circuitry in both said base unit and handset unit a reference frequency signal used for communicating over one of said plurality of communication channels, said intermediate frequency circuitry employing a first intermediate frequency signal for modulating said reference frequency signal for transmission by said first transmitter and a second intermediate frequency signal for modulating said reference signal for transmission by said second transmitter, said reference frequency signal operating at substantially the same frequency in both the handset unit and the base unit, said first intermediate frequency signal and said second intermediate frequency signal are different frequencies for simultaneous transmission and reception; wherein both said base unit and handset unit include frequency diversity circuits for transmitting both an upper and a lower sideband signal on each one the plurality of communication channels during a frequency hopping sequence for said handset and base units, said sideband signals being indicative of encoded audio signals being transmitted by both said handset and base units.

9. The method of operation for a cordless telephone as in claim 8 further including the step of providing encoded audio signals from the delta modulation circuitry to said intermediate frequency circuitry for modulating said first intermediate frequency signal and said second intermediate frequency signal.

10. The method of operation for a cordless telephone as in claim 9 further including the step of decoding audio signals encoded for transmission by said first and second transmitters when said encoded audio signals are received respectively by said second and first receivers.

11. A cordless telephone handset unit comprising:
    radio frequency circuitry for communicating synchronously with a cordless telephone base unit over any one of a plurality of radio frequency channels while operating in a frequency hopping system;
    intermediate frequency circuitry for modulating a first reference frequency signal used for communicating over one of said plurality of communication channels, said intermediate frequency circuit employing a first intermediate frequency signal for modulating said first reference frequency signal for transmission, said intermediate frequency circuitry for receiving a second reference frequency signal which has been modulated by a second intermediate frequency signal, said first reference frequency signal and said second reference frequency signal operating at substantially the same frequency, said first intermediate frequency signal and said second intermediate frequency signal are different frequencies for simultaneous transmission and reception; and
    delta modulation circuitry for encoding and decoding audio signals, said audio signals being encoded for transmission by said radio frequency circuitry to said base unit and decoded after receipt by said radio frequency circuitry from said base unit;

wherein said radio frequency circuitry includes a frequency diversity circuit for transmitting both an upper and a lower sideband signal on each one of the plurality of radio frequency channels during a frequency hopping sequence for said handset and base units, said sideband signals being indicative of encoded audio signals being transmitted by said handset unit to said base unit.

12. A cordless telephone handset unit comprising:

radio frequency circuitry for communicating synchronously with a cordless telephone base unit over any one of a plurality of radio frequency channels while operating in a frequency hopping system;

intermediate frequency circuitry for modulating a first reference frequency signal used for communicating over one of said plurality of communication channels, said intermediate frequency circuitry employing a first intermediate frequency signal for modulating said first reference frequency signal for transmissions said intermediate frequency circuitry for receiving a second reference frequency signal which has been modulated by a second intermediate frequency signal, said first reference frequency signal and said second reference frequency signal operating at substantially the same frequency said first intermediate frequency signal and said second intermediate frequency signal are different frequencies for simultaneous transmission and reception; and delta modulation circuitry for encoding and decoding audio signals, said audio signals being encoded for transmission by said radio frequency circuitry to said base unit and decoded after receipt by said radio frequency circuitry from said base unit;

wherein said radio frequency circuitry includes a frequency diversity circuit for selectively receiving either an upper or a lower sideband signal on each one of the plurality of radio frequency channels during a frequency hopping sequence for said handset and base units, said sideband signals being indicative of encoded audio signals being received from said base unit by said handset unit.

13. A cordless telephone base unit comprising:

radio frequency circuitry for communicating synchronously with a cordless telephone handset unit over any one of a plurality of radio frequency channels while operating in a frequency hopping system;

intermediate frequency circuitry for modulating a first reference frequency signal used for communicating over one of said plurality of communication channels, said intermediate frequency circuity employing a first intermediate frequency signal for modulating said first reference frequency signal for transmission, said intermediate frequency circuitry for receiving a second reference frequency signal which has been modulated by a second intermediate frequency signal, said first reference frequency signal and said second reference frequency signal operating at substantially the same frequency said first intermediate frequency signal and said second intermediate frequency signal are different frequencies for simultaneous transmission and reception; and delta modulation circuitry for encoding and decoding audio signals, said audio signals being encoded for transmission by said radio frequency circuitry to said handset unit and decoded after receipt by said radio frequency circuitry from said handset unit;

wherein said radio frequency circuitry includes a frequency diversity circuit for transmitting both an upper and a lower sideband signal on each one of the plurality of radio frequency channels during a frequency hopping sequence for said base and handset units, said sideband signals being indicative of encoded audio signals being transmitted by said base unit to said handset unit.

14. A cordless telephone base unit comprising:

radio frequency circuitry for communicating synchronously with a cordless telephone handset unit over any one of a plurality of radio frequency channels while operating in a frequency hopping system;

intermediate frequency circuitry for modulating a first reference frequency signal used for communicating over one of said plurality of communication channels, said intermediate frequency circuitry employing a first intermediate frequency signal for modulating said first reference frequency signal for transmissions said intermediate frequency circuitry for receiving a second reference frequency signal which has been modulated by a second intermediate frequency signal, said first reference frequency signal and said second reference frequency signal operating at substantially the same frequency said first intermediate frequency signal and said second intermediate frequency signal are different frequencies for simultaneous transmission and reception; and delta modulation circuitry for encoding and decoding audio signals, said audio signals being encoded for transmission by said radio frequency circuitry to said handset unit and decoded after receipt by said radio frequency circuitry from said handset unit;

wherein said radio frequency circuitry includes a frequency diversity circuit for selectively receiving either an upper or a lower sideband signal on each one of the plurality of radio frequency channels during a frequency hopping sequence for said base and handset units, said sideband signals being indicative of encoded audio signals being received from said handset unit by said base unit.

15. A method of operation for a cordless telephone handset unit comprising the steps of:

communicating synchronously with a cordless telephone base unit over any one of a plurality of radio frequency channels while operating in a frequency hopping system;

encoding and decoding audio signals through delta modulation, said audio signals being encoded in a delta modulator in said handset unit for transmission to said base unit and decoded in a delta demodulator in said handset unit after receipt from said base unit;

modulating in intermediate frequency circuitry in both said base unit and handset unit a reference frequency signal used for communicating over one of said plurality of communication channels, said intermediate frequency circuitry employing a first intermediate frequency signal for modulating said reference frequency signal for transmission by said first transmitter and a second intermediate frequency signal for modulating said reference signal for transmission by said second transmitter said reference frequency signal operating at substantially the same frequency in both the handset unit and the base unit, said first intermediate frequency signal and said second intermediate frequency signal are different frequencies for simultaneous transmission and reception; and transmitting both an upper and a lower sideband signal on each one of the plurality of radio frequency channels during a frequency hopping sequence for said handset and base units, said sideband signals being indicative of encoded audio signals being transmitted by said handset unit to said base unit.

16. The cordless telephone handset unit as in claim 12 wherein said frequency diversity circuit selects for decoding a best received one of said upper or lower sideband signal in the presence of radio frequency interference.

17. The cordless telephone base unit as in claim 14 wherein said frequency diversity circuit selects for decoding a best received one of said upper or lower sideband signal in the presence of radio frequency interference.

* * * * *